May 21, 1968 P. W. SCHUMACHER, JR., ET AL 3,384,191
DRILL BIT
Filed Aug. 13, 1965 4 Sheets-Sheet 1

Percy W. Schumacher, Jr.
Dan B. Justman
INVENTORS

BY
Vincent Martin
Jos. E. Edwards
M. Harvey Guy
ATTORNEYS

Percy W. Schumacher, Jr.
Dan B. Justman
INVENTORS

ATTORNEYS

May 21, 1968  P. W. SCHUMACHER, JR., ETAL  3,384,191
DRILL BIT

Filed Aug. 13, 1965  4 Sheets-Sheet 3

Percy W. Schumacher, Jr.
Dan B. Justman
INVENTORS

BY Vincent Martin
Joe E. Edwards
M. Harvey Gay
ATTORNEYS

May 21, 1968  P. W. SCHUMACHER, JR., ET AL  3,384,191
DRILL BIT
Filed Aug. 13, 1965  4 Sheets-Sheet 4
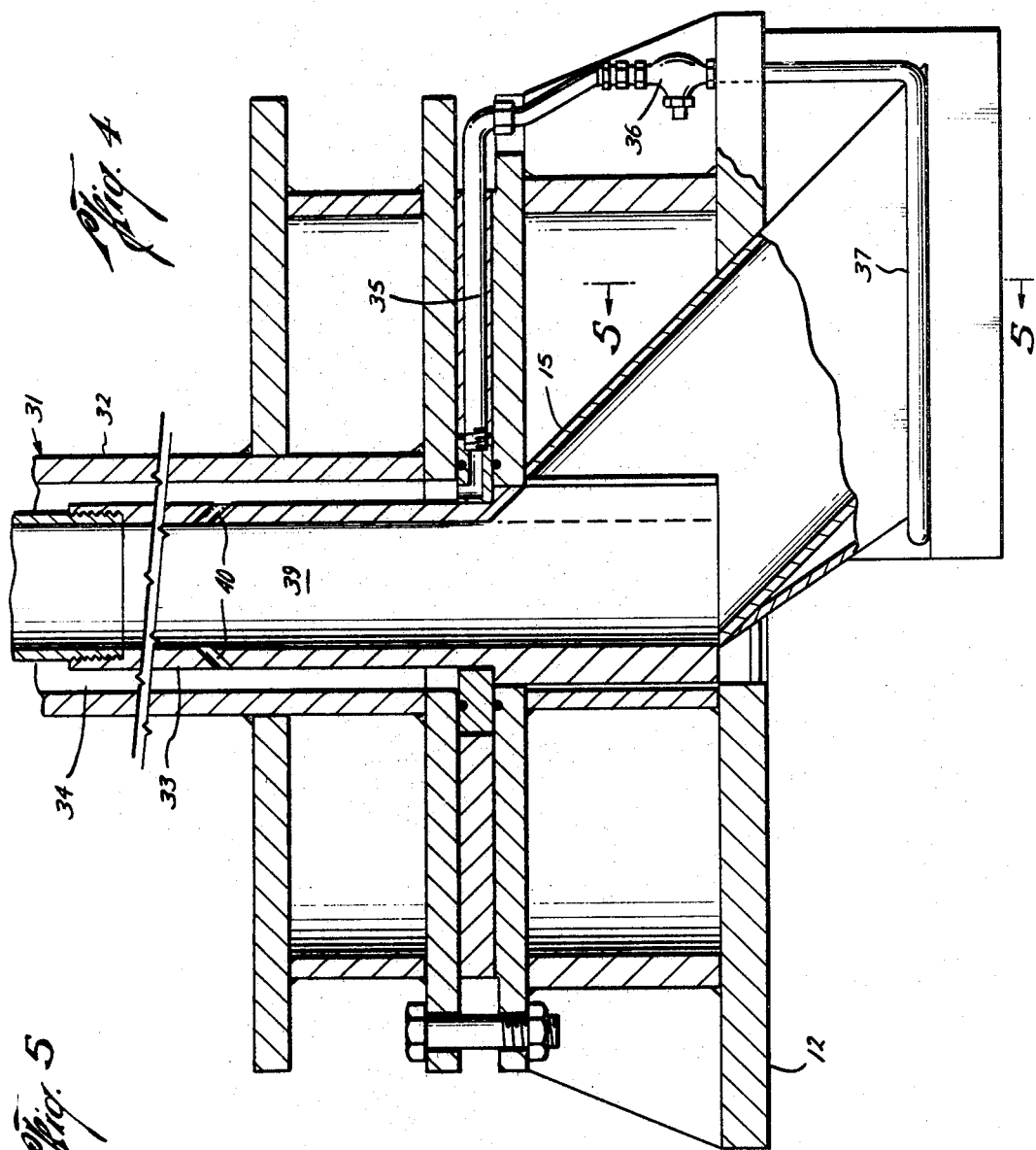
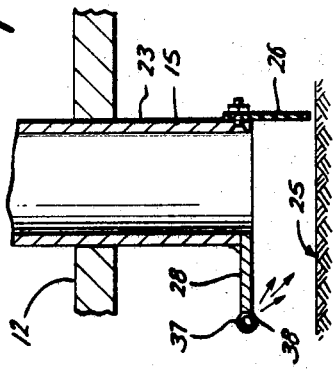
Percy W. Schumacher, Jr.
Dan B. Justman
INVENTORS
BY
ATTORNEYS though it may be preferable to stagger the cutter assemblies as shown in FIGURE 1 so that the outer cutter assembly 21 is disposed at approximately right angles to the inner cutter assemblies 20. The cutters 20 and 21 are arranged to cover substantially the entire bottom of the bore hole being drilled and it will be appreciated that as many sets of cutters as are necessary to cut the bottom of the bore hole may be employed.

United States Patent Office 3,384,191
Patented May 21, 1968

3,384,191
DRILL BIT
Percy W. Schumacher, Jr., and Dan B. Justman, Houston, Tex., assignors to Reed Roller Bit Company, Houston, Tex., a corporation of Texas
Filed Aug. 13, 1965, Ser. No. 479,429
7 Claims. (Cl. 175—340)

ABSTRACT OF THE DISCLOSURE

The invention relates to a bit head employed in earth boring in which a hollow cuttings pickup on said bit head extends substantially from the center to the periphery of the bit, the bottom of the cuttings pickup being spaced closely adjacent the bottom of the borehole and communicating with a hollow drill stem whereby the drilling fluid may circulate upwardly through the cuttings pickup and drill stem. The spacing of the bottom of the cuttings pickup from the hole bottom is such that the velocity of the drilling fluid circulating thereunder is greatly increased to enhance the pickup of cuttings produced by the operation of drilling a borehole.

---

This invention relates generally to earth boring drills of the roller cutter type, particularly those used in drilling relatively large diameter bore holes, and more particularly to means for removing cuttings from the bottom of the hole being drilled.

In the drilling of earth bores and well shafts and the like, a bit head, having cutters mounted on the lower portion thereof, is connected to the lower end of a hollow central drill stem which is rotated to cause the cutters to roll upon the bottom of the bore hole being produced to cut or crush the formation being encountered. A drilling fluid, which may be a gas or a liquid, is pumped downwardly to the bit head and rises to the surface to cool and clean the drill bit cutters and to remove the cuttings from the bore hole.

The fluid may be pumped downwardly through the drill stem and bit head and rise in the space between the drill stem and the wall of the hole to the surface of the earth to carry the cuttings from the hole. A reverse flow of drilling fluid may be employed by pumping the drilling fluid downwardly about the drill stem and thence upwardly through the interior of the drill stem. Alternately, a double wall tubular drill stem may be used in which case the fluid may be pumped downwardly between the inner and outer drill stem tubes and may rise upwardly to the surface of the earth through the interior of the inner tube of the double wall drill string. It will be appreciated that the circulation may be established in various ways, but the velocity of the returning drilling fluid must be such that it is sufficient to carry the cuttings away from the working surface of the bore hole.

One of the most important desired functions of the drilling fluid thus circulating is to remove quickly the cut or crushed particles of the formation from the bottom of the hole and from the roller cutters. This function is not always efficiently performed, especially in the drilling of large diameter holes, because of the required volumes and velocities of circulating fluid necessary to entrain and carry cuttings to the surface of the earth. If the cuttings are not quickly removed, they may be recut by the roller cutters, and the formation particles may accumulate around the cutters and between a bit head and the bottom of the hole whereby the cutters may cease to rotate on their axes and may be worn by skidding upon the hole bottom, thus reducing the useful life of the drill bit. Such formation clogging of the drill bit is commonly known as "balling up."

This invention has for one of its general objects the provision of a new and improved roller type drill bit having means arranged to cause the drilling fluid to perform the desired function of quickly removing the formation particles from the bottom of the hole and the areas around the roller cutters.

Another object is to provide a new and improved drill bit which will effectively produce a relatively large diameter bore hole.

Another object is to provide a new and improved drill bit for drilling large bore holes which will entrain cuttings produced by the drilling operation and return them to the surface of the earth through the drill stem.

Another object is to provide a new and improved cuttings pickup for a roller drill bit.

Another object of the invention is to provide a new and improved cuttings pickup for a roller drill bit wherein the drilling fluid velocity between the bottom of the hole and the cuttings pickup, and in the drill stem, is enhanced.

Another object of the invention is to provide a new and improved radially extending cuttings pickup for a roller cutter drilling bit which cuttings pickup extends from a point adjacent the axis of rotation of the drilling bit to a point adjacent the gage area of the hole being drilled.

Other objects will become apparent from the following description and the accompanying drawings in which:

FIGURE 4 is a sectional view through a drill bit showing another embodiment of the invention having a modified circulation system.

FIGURE 5 is a sectional view taken along line 5—5 in FIGURE 4.

Figure 1:
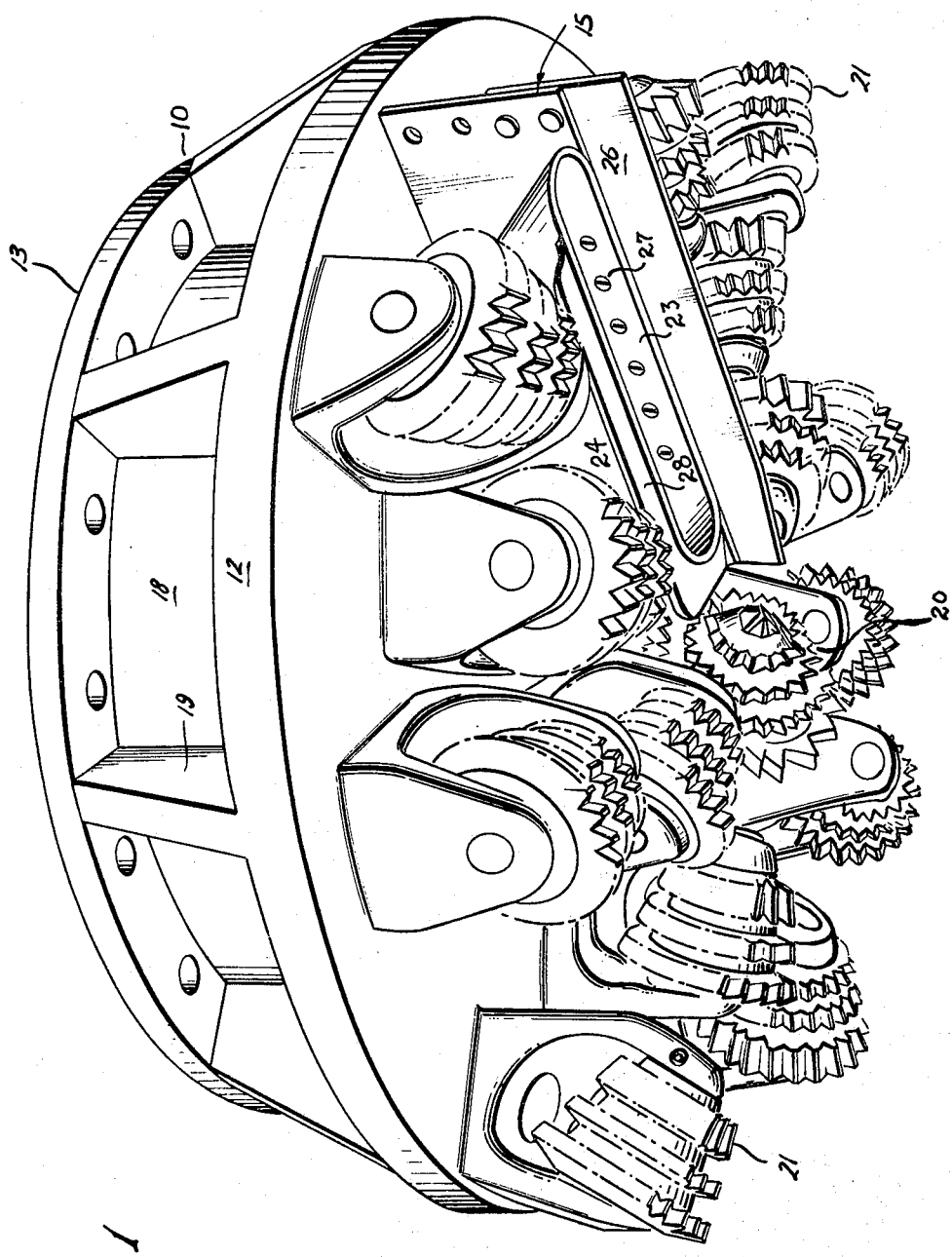
FIGURE 1 is a pictorial view of a roller cutter drill bit showing the spacing of the cutters and the arrangement of the cuttings pickup.
Figure 2:
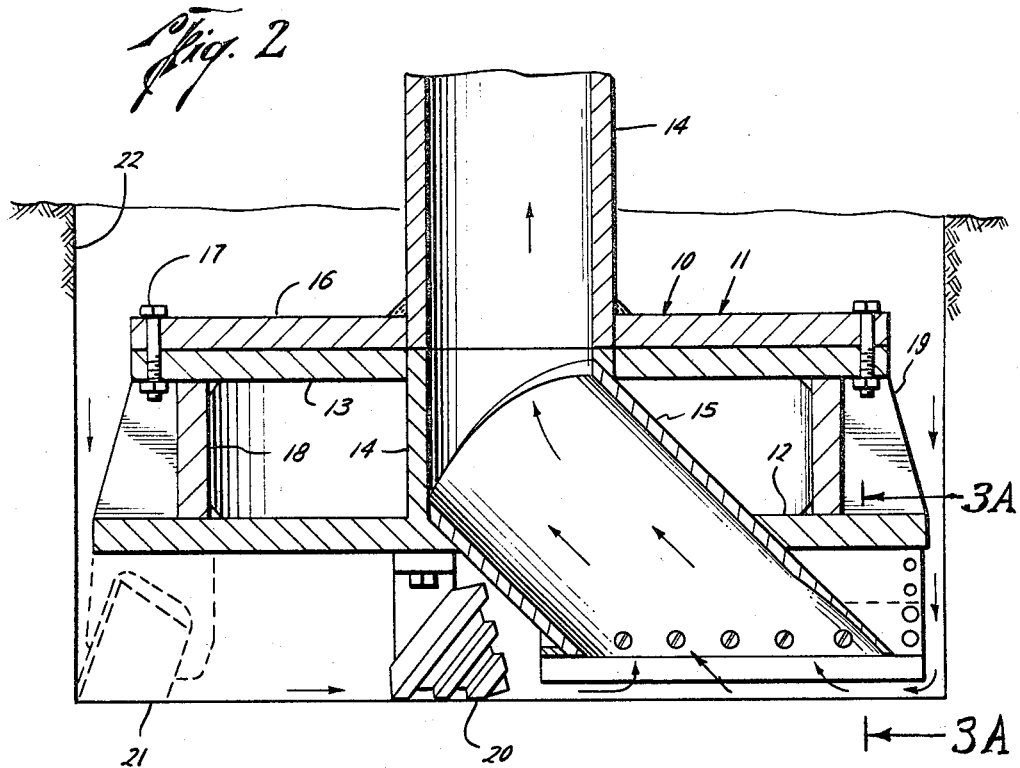
FIGURE 2 is a sectional view of the bit shown in FIGURE 1, showing schematically the circulation system of the drilling bit of the invention.

Referring to FIGURES 1 and 2, a drill embodying the invention is shown generally at 10 and includes a bit head 11. The bit head 11 comprises a lower plate 12 and an upper plate 13. A cylindrical member 14 extends downwardly through the plate 13 and is connected to an elongate radially extending intake member 15 and to the plate 16. The plate 16 is secured to the plate 13 by means of bolts 17. An outer cylindrical spacer 18 is provided between the plates and reinforcing gussets 19 are disposed circumferentially around the bit head and secured by welding to the cylindrical spacer 18 and the plates 13 and 12. The cylindrical spacer 18 is also secured by welding to the plates 12 and 13. Central cutter assemblies 20 are bolted or otherwise secured to the lower surface of the plate 12 and intermediate and outer cutter assemblies 21 are also attached to the lower surface of plate 12 in a similar manner. Each cutter assembly is mounted on a downwardly and inwardly disposed shaft (not shown) on which are mounted roller cutters. The roller cutters may have conventional cutting teeth or other cutting elements and may be mounted on suitable bearings as is well known in the art.

As may be seen, the cutter assemblies 20 are arranged centrally to cut at and proximate the axis of the drill, and the cutter assemblies 21 are disposed to cut intermediate paths and near the wall 22 of the bore hole whereby the entire bottom of the bore hole may be drilled.

The cuttings pickup 15 or intake extends in the form of a relatively narrow opening formed by rear plate 23 and front plate 24 as can be seen in FIGURES 2 and 3A through 3E, the plates defining the forward and rearward end with respect to rotation of the intake extend relatively close to the bottom of the hole 25 being drilled. Thus as a fluid such as air or water is pumped downwardly about the drill stem 14 to the bottom of the hole 25, the fluid returns to the drill stem 14, picking up through the cuttings pickup 15 cuttings and detritus being produced by the drilling operation. It will be appreciated that the large volume of fluid which is being pumped down about the drill stem 14 and between it and the wall 22 of the bore hole is now constrained to pass through the relatively small confine of the cuttings pickup 15; whereupon for a given volume of fluid thus circulating, the velocity will be increased thereby enhancing the desired cutting removal from the working area of the drill bit cutters.

Since the cutting intake 15 extends relatively close to the bottom of the hole, it will be apparent that the velocity of the fluid passing the forward plate 24, for example, into the radial intake 15 will be enhanced in velocity because of the constricted nature of such passage. Since the entire drill bit is rotated by the drill stem 14, and the cuttings pickup 15 extends substantially from the center of the hole to the wall thereof, as the bit is rotated the cuttings intake 15 also is rotated so that as it rotates the entire bottom of the hole is cleaned from cuttings or other detritus. Various schemes may be utilized for the lower portions of the cuttings intake such as for example that shown in FIGURE 3A wherein a flexible member 26 which may be made of neoprene belting or the like is fastened to the rear plate 23 by means of bolts 27 to act as a sweep on the bottom of the hole. Further, a forward extension plate 28 may be attached to the lower end of 24 by means of welding or the like in which case the fluid velocity between the extension 27 and the bottom of the bore hole 25 is maintained for a longer distance in order to pick up such assembly.

Figure 3C:
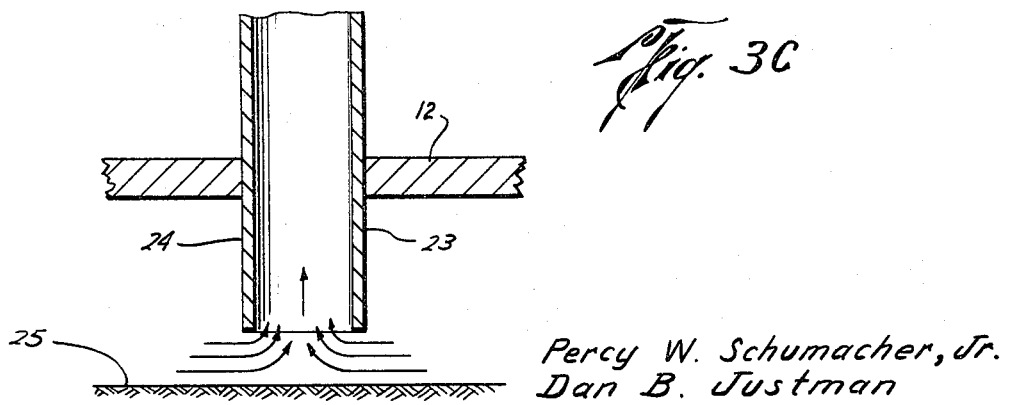
FIGURES 3B through 3E are views similar to FIGURE 3A but showing various embodiments of the cuttings pickup.
Figure 3B:
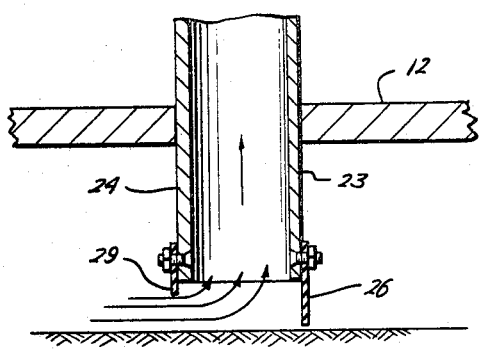
Figure 3A:
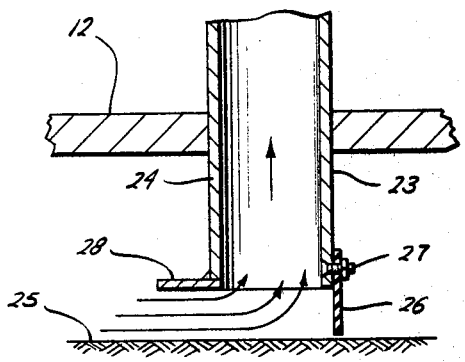
FIGURE 3A is a view taken generally along line 3A—3A in FIGURE 2, showing an embodiment of the cuttings pickup of the invention.

FIGURE 3B shows an intake arrangement similar to that just described but with a flexible sweep 29 attached to the forward plate 24 of the cuttings pickup.

Figure 3D:
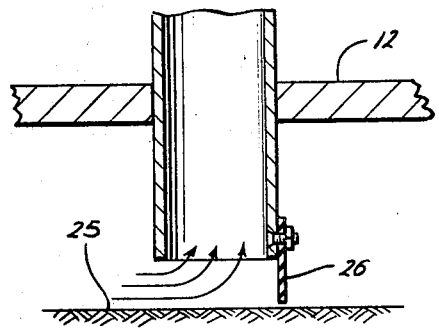

FIGURE 3D shows an entrance to the cuttings pickup which is similar to those just described but in this embodiment eliminates the front extension 28 and the front extension 29.

Figure 3E:
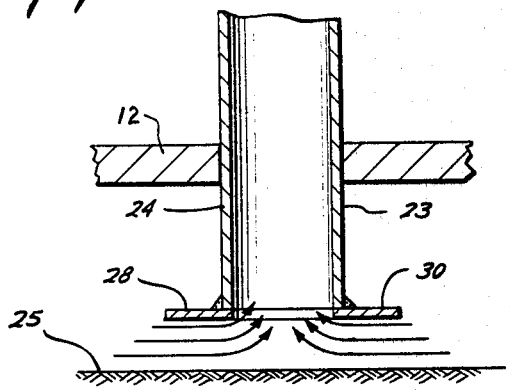

The embodiment shown by FIGURE 3E has the forward extension 28 and a rearward extension 30 to provide for a longer path of high velocity fluid flow between such extension and the bottom of the hole to enhance the cuttings pickup.

FIGURES 4 and 5 show an embodiment of the invention which is particularly adaptable when it is desirable to use air as a circulating fluid and there is a problem of water influx which causes water to stand in the bore hole. Under these circumstances, one method in practice has been to use a double wall drill stem 31 and to circulate high pressure air down the annulus 34 between the tubes 32 and 33. The high pressure air coming out of openings 40 close to the bottom of the hole bubbles up through the interior 39 of the tube 33 thereby airlifting water from this inner pipe out of the hole and causing a circulation of water around the bit head thereby removing the cuttings. The improvement of this embodiment being that a portion of the high pressure air that is pumped down through the annular space 34 is bled off through fluid conduit 35 through the metering valve 36 and into fluid distribution tube 37. The fluid distribution tube may be fastened to the forward extension 28 and has openings 38 arranged to direct the high pressure air downwardly between the forward plate 28 and the bottom of the bore hole 25, whereupon the high pressure air mixes with the water circulating up through the cuttings pickup 15 thereby increasing the velocity of the fluid return. The amount of air shunted through the openings 40 and 38 may be regulated by the setting of the valve 36 which is set before the drill bit is lowered into the bore hole and such setting may be determined empirically. In the cuttings pickup of the invention, it has been found satisfactory to use only one radially extending opening such as that shown. With this arrangement a minimum amount of the space on the bottom of the bit is used for such cuttings pickup and while of course more than one cuttings pickup may be used, it has been found that a cuttings pickup extending substantially from the center of the bore hole to the wall of the bore hole is very efficient in operation and it will be appreciated that as the bit turns, the cuttings pickup also turns with the bit whereby substantially the entire bottom of the hole is traversede by the cuttings pickup. Thus the circulating fluid is constrained to flow near the bottom of the bore hole, and the arrangement of the cuttings pickup is such that the velocity of the circulating fluid is enchanced, thereby enhancing the efficiency of the scavenging of the circulating system.

With the cuttings pickup arranged as shown in the invention, more freedom of the spacing and placing of the cutter assemblies on the bit head is provided, which is another advantage.

This invention is not limited to the embodiments shown. Various changes within the scope of the following claims will occur to those skilled in the art.

What is claimed is:

1. In an earth boring drill, a bit head having a plurality of cutter assemblies mounted thereon and extending downwardly therefrom and arranged to cut paths on the bottom of a hole being drilled, a hollow drill stem connected to said bit head and adapted to effect rotation of the drill, means adapted to circulate drilling fluid downwardly about said drill stem and bit head, a hollow cuttings pickup opening on said bit head, said cuttings pickup being elongate and extending substantially from the center to the periphery of said bit head, the bottom of the cuttings pickup being spaced closely adjacent the bottom of the bore hole and communicating with the interior of the hollow drill stem whereby the drilling fluid may circulate upwardly through the cuttings pickup and drill stem, the spacing of the bottom of the cuttings pickup from the bottom of the hole being such that the velocity of the drilling fluid circulating thereunder is greatly increased to enhance the pickup of cuttings being produced by the drilling operation.

2. In an earth boring drill, a bit head having a plurality of cutter assemblies mounted thereon and extending downwardly therefrom and arranged to cut paths on the bottom of the hole being drilled, a hollow drill stem connected to said bit head and adapted to effect rotation of the drill, means adapted to circulate drilling fluid downwardly about said drill stem and bit head, a hollow cuttings pickup opening on said bit head, the bottom of the cuttings pickup being spaced closely adjacent the bottom of the bore hole and communicating with the interior of the hollow drill stem, said cuttings pickup having at least one flexible member secured to a bottom portion thereof and substantially bridging the space between the bottom of the cuttings pickup and the bottom of the borehole whereby the drilling fluid may circulate upwardly through the cuttings pickup and drill stem, the spacing of the bottom of the cuttings pickup from the bottom of the hole being such that the velocity of the drilling fluid circulating thereunder is greatly increased to enhance the pickup of cuttings being produced by the drilling operation.

3. An earth boring drill in accordance with claim 2 wherein the lower portion of the cuttings pickup has secured thereto an extension extending forwardly of said pickup with respect to the direction of rotation of said bit.

4. An earth boring drill in accordance with claim 2 wherein the lower portion of the cuttings pickup has secured thereto an extension extending rearwardly of said pickup with respect to the diretcion of rotation of said bit.

5. An earth boring drill in accordance with claim 2 wherein the lower portion of the cuttings pickup has extensions thereon, one extension extending forwardly and one extension extending rearwardly of said pickup with respect to the direction of rotation of said bit.

6. In an earth boring drill, a bit head having a plurality of roller cutter assemblies mounted thereon and extending downwardly therefrom and arranged to cut paths on the bottom of a hole being drilled, a hollow drill stem connected to said bit head adapted to effect rotation of the drill, means adapted to circulate drilling fluid downwardly about said drill stem and bit head, a hollow cuttings pickup opening on said bit head extending substantially from the center to the periphery of the bit, the bottom of the cutings pickup being spaced closely adjacent the bottom of the bore hole and communicating with the interior of the hollow drill stem whereby the drilling fluid may circulate upwardly through the cuttings pickup and drill stem, the spacing of the bottom of the cuttings pickup from the hole bottom being such that the velocity of the drilling fluid circulating thereunder is greatly increased to enhance the pickup of cuttings being produced by the drilling operation.

7. In an earth boring drill, a bit head having a plurality of cutter assemblies mounted thereon and extending downwardly therefrom and arranged to cut paths on the bottom of a hole being drilled, a hollow drill stem connected to said bit and adapted to effect rotation of the drill, an elongate cuttings pickup opening on said bit head extending substantially from the central portion toward the periphery of the bit and communicating with the interior of the drill stem, the cuttings pickup being associated with the bottom of the hole whereby cuttings may circulate upwardly therethrough and into said drill stem.

References Cited
UNITED STATES PATENTS

| | | | |
|---|---|---|---|
| 1,289,179 | 12/1918 | Hughes | 175—340 |
| 1,582,332 | 4/1926 | Brutus | 175—339 X |
| 1,736,840 | 11/1929 | Scott | 175—340 |
| 2,518,591 | 8/1950 | Aston | 175—215 |
| 2,710,741 | 6/1955 | Hall | 175—340 X |
| 2,849,214 | 8/1958 | Hall | 175—315 X |
| 2,887,301 | 5/1959 | Day | 175—339 X |
| 2,949,281 | 8/1960 | Baur | 175—340 X |
| 3,297,100 | 1/1967 | Crews | 175—215 X |

NILE C. BYERS, Jr., *Primary Examiner.*

ERNEST R. PURSER, *Examiner.*